G. H. DAY.
TRIAL FRAME.
APPLICATION FILED DEC. 26, 1917.
1,266,224.
Patented May 14, 1918.
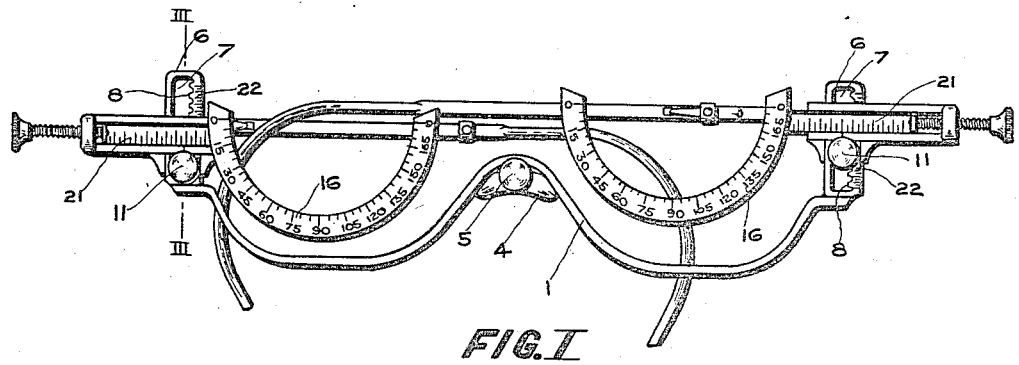
FIG. I
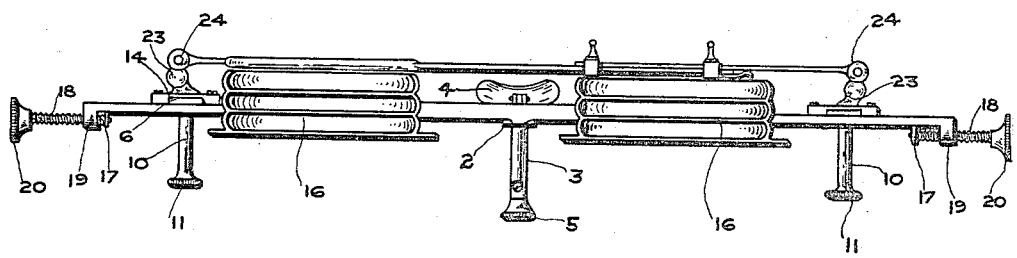
FIG. II
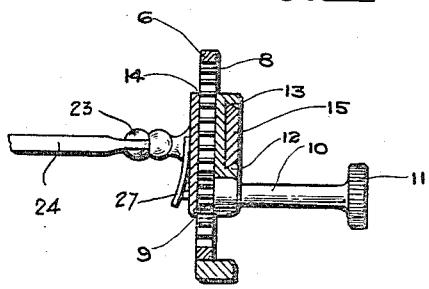
FIG III
INVENTOR
GEORGE H. DAY
BY
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TRIAL-FRAME.

1,266,224.  Specification of Letters Patent.  Patented May 14, 1918.

Application filed December 26, 1917. Serial No. 208,933.

*To all whom it may concern:*

Be it known that I, GEORGE H. DAY, a citizen of the United States, residing at Southbridge, in the county of Worcester and State of Massachusetts, have invented certain new and useful Improvements in Trial-Frames, of which the following is a specification.

This invention relates to improvements in eye testing devices and has particular reference to that type of device commonly termed a trial frame.

One of the leading objects of the present invention is the provision of a novel and improved construction of trial frame in which the cells for retaining the testing lenses may be separately and independently adjusted in place of simultaneously adjusted, as is the common practice with frames now commercially employed.

A further object of the present invention is the provision of a novel and improved trial frame, in which the testing lenses or cells retaining the same may be adjusted separately and independently not only to retain correct pupilary distance or separation between the centers of the testing lenses, but may in addition be separately and independently adjusted for height in the event that the pupil or center of one eye is normally disposed slightly above or below that of the other eye.

A further object of the present invention is the provision of a novel and improved trial frame which will obviate the necessity for unsightly and uncomfortable upper cross bars or sustaining members for the lens cells, and will render the cells themselves much more accessible and permit of more ready interchange of testing lenses than is possible with the present types of adjustable frames.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front elevation of a frame constructed in accordance with and embodying certain of my improvements.

Fig. II represents a top plan view thereof.

Fig. III represents a sectional view taken on the line III—III of Fig. I.

In the drawings, in which similar characters of reference are employed to denote corresponding parts throughout the several views, the numeral 1 designates the main spring bar of my improved trial frame, which is shown as curved to fit around the nose and down toward the cheeks of the wearer, and is centrally provided with the bearing 2 for the adjustable bridge bar 3 bearing the crest pad 4 and adapted to be adjusted by turning of the thumb screw 5 to shift the bridge in and out with respect to the main bar 1. Rising from the bar 1 at each end thereof is the standard or cell support 6, centrally slotted as at 7 and provided at one side of the slot with the rack portion 8 adapted to be engaged by the pinion 9 on the spindle 10, having on its forward end the knurled head 11 to facilitate rotation of the spindle and pinion. The spindle 10 is journaled or rotatably secured within the lower portion of the slide block 12, which is slidably mounted upon the standard 6, and has formed therein the dovetail groove or guide way 13 extending at right angles to the passage 14 in which the standard 6 rides, while slidably mounted within the guide way 13 is the supporting bar 15 for the multiple lens cells 16, as should best be understood by reference to Fig. I.

The bar or slide 15 is provided at its outer ends with the projection 17 adapted to be rotatably engaged by the end of the adjusting screw 18 intermediately threaded into the lug 19 on the block 12 and provided on its outer end with the operating head 20, whereby turning of the head 20 will cause the screw to feed in or out with respect to the lug 19 and thus shift the slide bar 15 and its attached lens cells 16 in or out, as may be desired by the fitter or person conducting the test. The slide 15 and adjacent portion of the block 12 are preferably provided with suitable scales or graduations, as at 21, to facilitate a reading of the particular adjustment of the center of the lens test. Similarly, the standard 6 is provided with graduations as at 22, serving in connection with the edge of the slide block 12 to indicate the vertical adjustment of the cell.

Secured to the rear of the slide block 12 is the end piece 23 adapted to receive a suitable temple 24 for retaining the frame in position on the face of the patient.

In the use of my improved trial frame, the frame is placed in position on the face of the patient and the crest pad 4 and temples 24 adjusted to retain the bar 1 in suitable relation to the face; suitable test lenses are then placed with the cells 16 and the cells adjusted laterally by turning of the head 20 and screw 18 until the correct pupilary width has been determined, and it is then independently vertically adjusted by turning of the head 11 on the spindle 10 until through the rack and pinion adjustment the block has been moved to the proper height to center the test lens before the eye of the patient.

The two eyes being entirely independently adjusted, the frame and lenses are sure to fit in exact correct position before the eyes in place of an approximation or average being taken, as is very liable to be the case with those types of frames in which the two eyes are adjusted both laterally and for height at one time, in place of by separate adjustment, and consequently the needs of the patient are much better recognized and taken care of. At the same time it will be noted that by removing all parts usually present on the outer portion of the trial frame in order to secure the desired adjustments of the parts, I am able to get along with only half cells in place of complete cells or cells having spring clips, and that consequently I may very quickly and readily insert or remove the test lenses, facilitating the speed of refraction or testing of the patient. To further facilitate this testing of the patient I preferably place on the front of the lens cells 16 the arcuate graduated member 25, the graduations on this member serving to indicate the axis at which a lens within the cell is placed, and thus aiding in determining the cylindrical correction of the patient.

In the vertical adjustment of my improved lens cells it will be understood that ordinarily the distance between the standard or support 6 and the guide way 14 in the block will be sufficient to hold the parts in adjusted position, but should this for any reason appear insufficient I may make use of a suitable friction brake, such as a spring interposed between the support and block or the exterior friction brake 27 in the form of a spring or the like, bearing against the spindle 10, or may employ both of these friction devices should it appear necessary. It will also be understood that I may substitute other locking means for the particular friction devices here shown to secure the frame in desired vertically adjusted position, the main essential being the provision of suitable locking means or retarding means for holding the parts in desired adjustment.

I claim:

1. In a device of the character described, the combination with a main frame, of standards rising therefrom, blocks mounted on the standards, means for vertically shifting the blocks on the standards, horizontal slides carried by the blocks, lens cells secured to the slides, and means for adjusting the slides to vary the position of the lens cells.

2. In a device of the character described, the combination with a main frame, of a standard rising therefrom near each end thereof, slide blocks carried by the standards, slides engaging the blocks, lens cells carried by the slides, and means for independently vertically and laterally adjusting said cells with respect to each other.

3. In a trial frame, the combination with a supporting bar, of a nose rest carried thereby, guides rising from the bar, independent cells for the two eyes of the patient, one of said cells being mounted on each of the guides, and means for vertically and laterally adjusting the cell with respect to its guide.

4. In a device of the character described, the combination with a main frame, of a standard rising from the frame at each end thereof and provided with a rack, a lens cell and guide for the cell interlocking with the standard, and means on the guide engaging the rack to control the adjustment of the cell.

5. A trial frame, including a frame bar and a support rising from the frame bar, a lens cell having a lateral extension overlying the frame bar, a block having cross guide ways, one of which receives the support on the frame, and the other of which receives the extension on the cell, means for adjusting the block along its support, and means for adjusting the extension with respect to the block whereby the cell may be positioned as desired with respect to the main frame.

6. In a device of the character described the combination with a main frame, of a standard rising therefrom near each end thereof, slide blocks carried by the standards, slides engaging the blocks, lens cells carried by the slides, means for independently, vertically, and laterally adjusting said cells with respect to each other, and means for retaining the same in a vertically adjusted position.

7. In a device of the character described, the combination with a main frame, of standards rising therefrom, blocks mounted on the standards, a rack on each of the standards, openings carried by the blocks for engagement with the racks, means for operating the racks to vertically shift the blocks on the standards, horizontal slides carried by the blocks, lens cells secured to the slides, and adjusting means connected with the slides to operate the same and vary the position of the lens cells.

In testimony whereof I have affixed my signature, in presence of two witnesses.

GEORGE H. DAY.

Witnesses:
WILLIAM B. JONES,
WM. P. CHASE.

Copies of this patent may be obtained for five cents each, by addressing the "Commissioner of Patents, Washington, D. C."